June 4, 1935.  T. CORBEELS  2,003,426
METHOD OF AND APPARATUS FOR WORKING MATERIALS
Filed Nov. 11, 1933  4 Sheets-Sheet 1
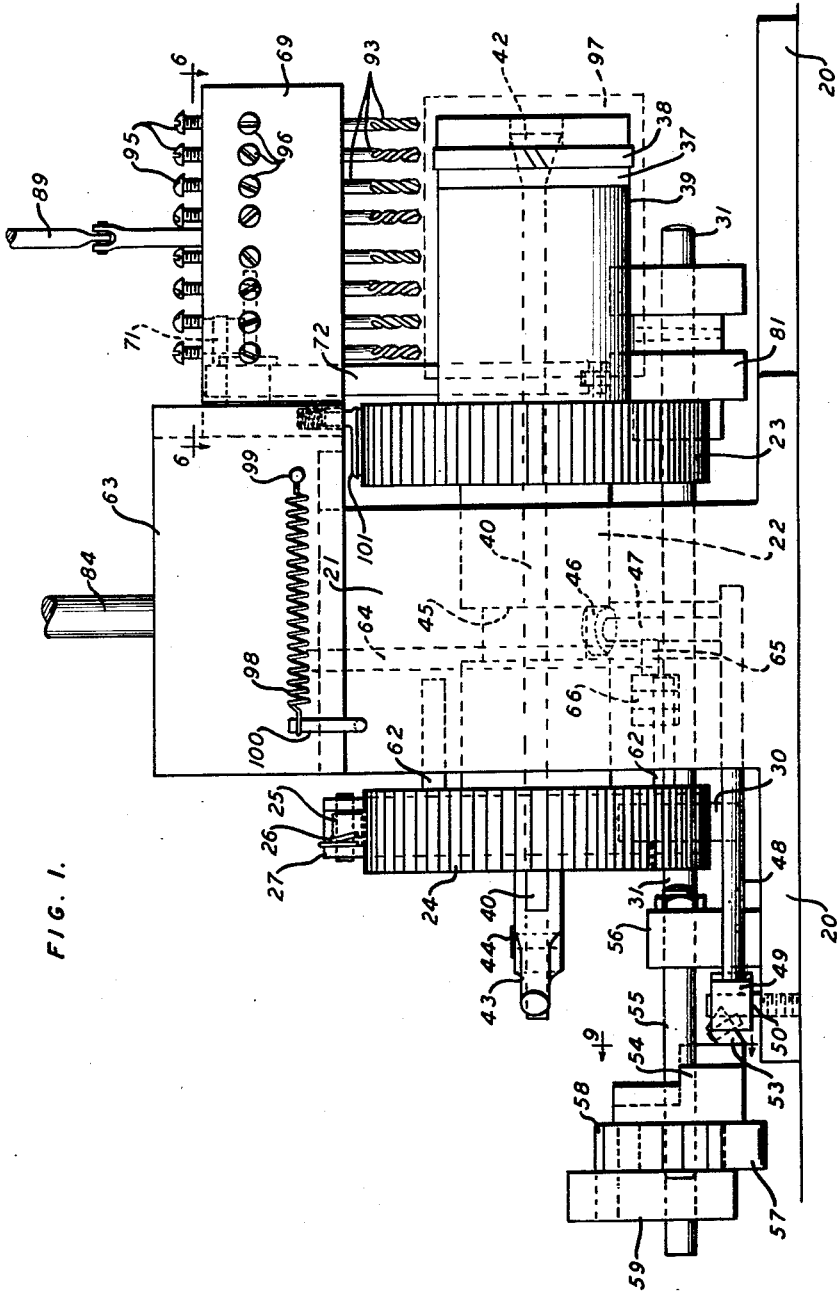
INVENTOR
T. CORBEELS
BY E.R. Nowlan
ATTORNEY June 4, 1935. T. CORBEELS 2,003,426
METHOD OF AND APPARATUS FOR WORKING MATERIALS
Filed Nov. 11, 1933 4 Sheets-Sheet 2
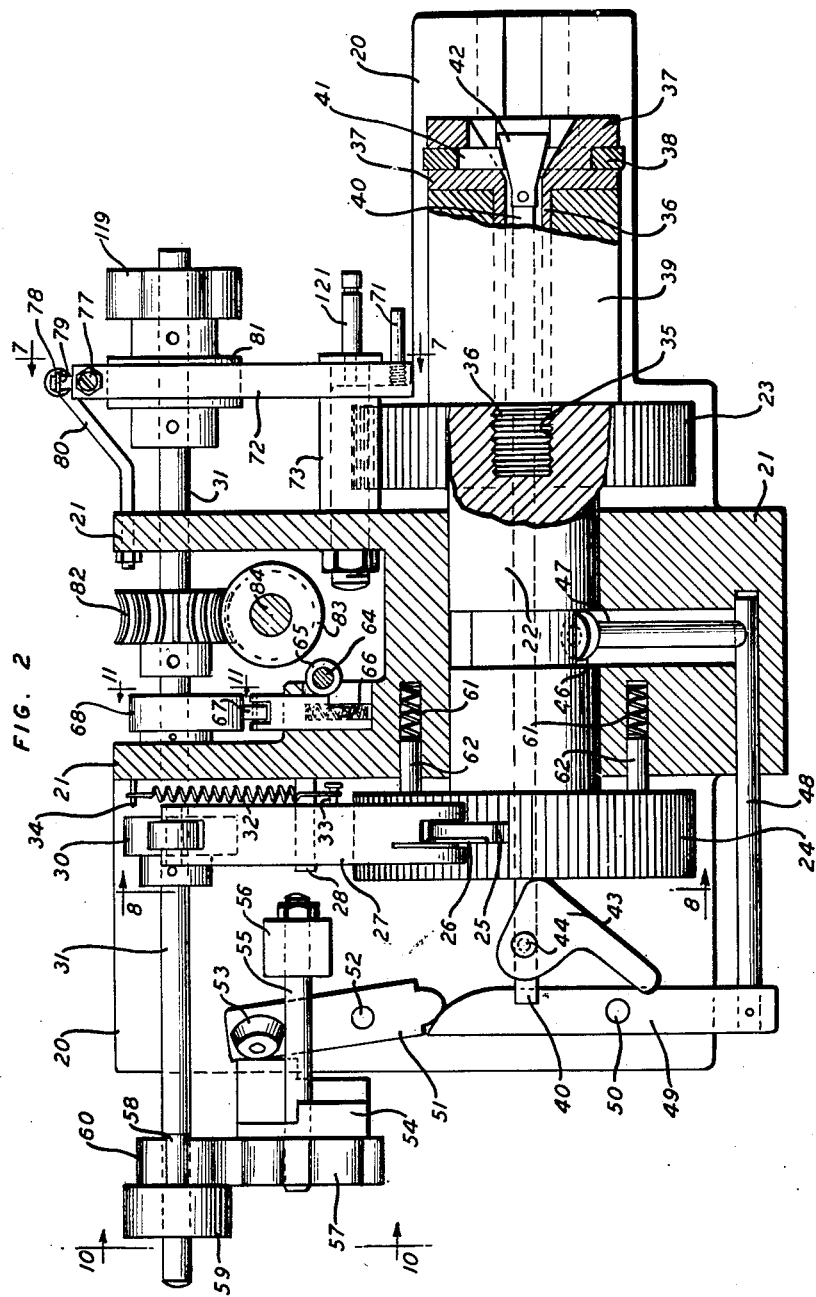
INVENTOR
T. CORBEELS
BY E.R. Nowlan
ATTORNEY June 4, 1935.   T. CORBEELS   2,003,426
METHOD OF AND APPARATUS FOR WORKING MATERIALS
Filed Nov. 11, 1933   4 Sheets-Sheet 3
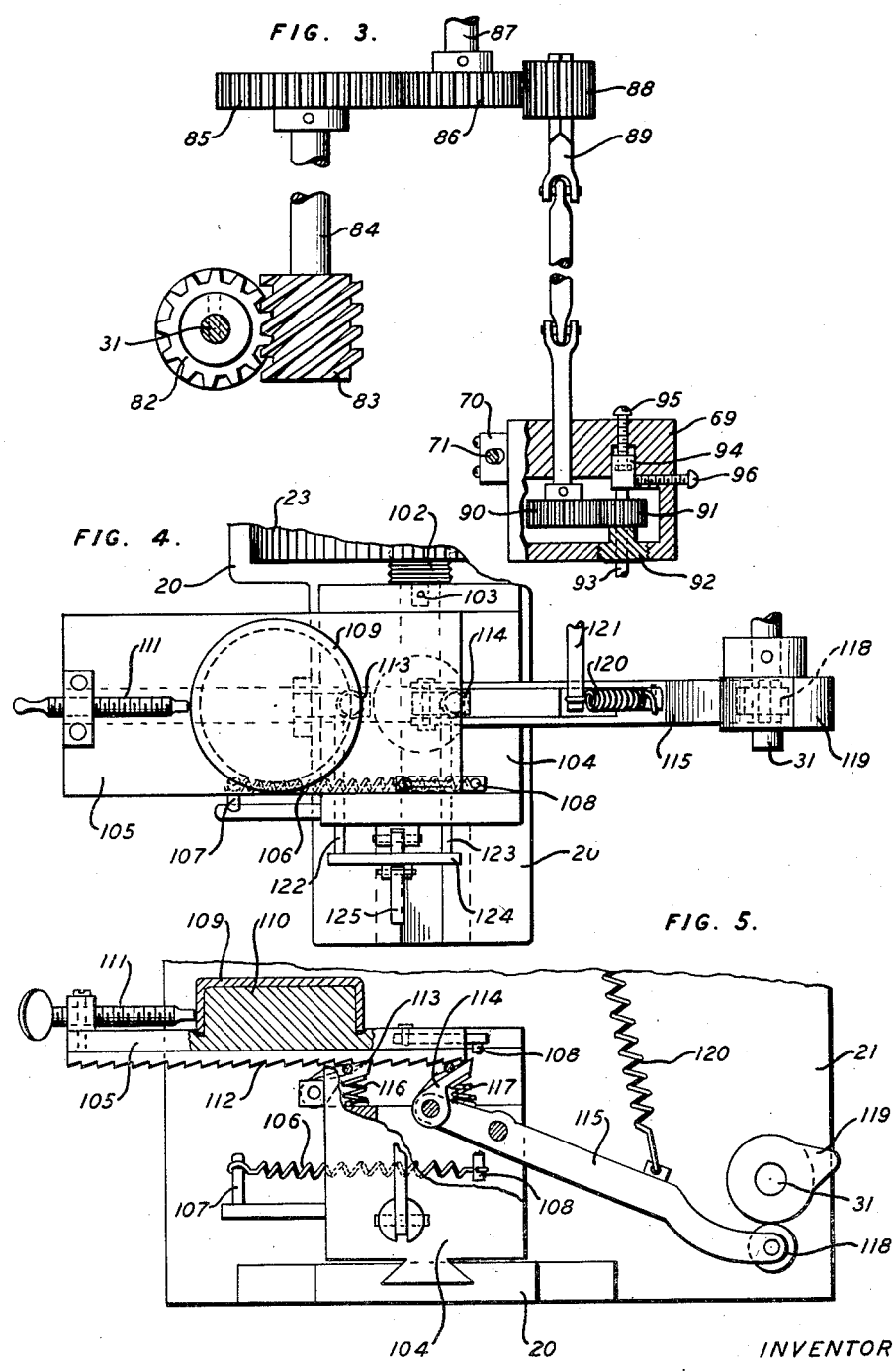
INVENTOR
T. CORBEELS
BY
E.R. Nowlan
ATTORNEY June 4, 1935. T. CORBEELS 2,003,426
METHOD OF AND APPARATUS FOR WORKING MATERIALS
Filed Nov. 11, 1933 4 Sheets-Sheet 4

INVENTOR
T. CORBEELS
BY
E.R. Nowlan
ATTORNEY

Patented June 4, 1935

2,003,426

UNITED STATES PATENT OFFICE 2,003,426

METHOD OF AND APPARATUS FOR WORKING MATERIALS

Theophile Corbeels, Garwood, N. J., assignor to Western Electric Company, Incorporated, New York, N. Y., a corporation of New York Application November 11, 1933, Serial No. 697,563

13 Claims. (Cl. 41—1)

This invention relates to a method of and apparatus for working materials and more particularly to a method and a machine for producing surface finishes analogous to a psuedo hand hammered appearance on curved or flat surfaces of articles.

It may often be desirable to furnish an article with an irregularly marked, erose or indented surface ornamentation such as may be produced by hand hammering with a ball peen hammer, and yet without disturbing or affecting an opposite surface of the article as is done by hammering.

An object of the present invention is to provide a machine with which material may be removed from a curved or flat surface of even a relatively thin walled article at apparently irregularly disposed points thereof to produce a seemingly irregularly marked, erose or pitted surface.

To this end one embodiment of the invention presents a machine adapted to employ the method, having a carriage to hold an object to be operated on, the carriage being driven to automatically advance the object in steps in two diverse directions under a second carriage on which a plurality of power driven tools is mounted. Means are provided first to move the gang of tools toward and from the work and second to move the gang of tools stepwise along the work transversely of one of the motions of the first carriage. The several stepwise motions are so related that the regularity of arrangement of the resulting markings in the work is so complex that the marks appear to be haphazard rather than in regular order.

These and other objects and characteristics of the invention will appear from the following detailed description of one embodiment of the machine of the invention taken in connection with the adjoined drawings in which identical reference numerals are applied to the same parts in the several views and in which Fig. 1 is a diagrammatic view in front elevation of a machine embodying the invention;

Fig. 2 is a similar view thereof in plan and partly in horizontal section with the tool carriage removed;

Fig. 3 is a diagrammatic view of the principal drive;

Fig. 4 is a broken plan view of a special removable attachment in situ on the machine;

Fig. 5 is a view thereof in end elevation and partly in vertical section;

Figure 6:
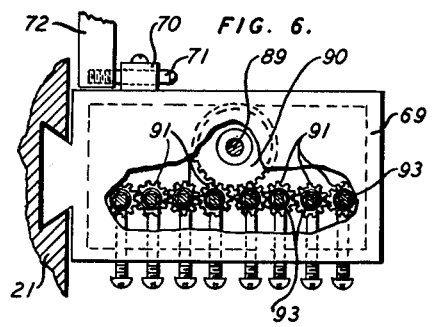
Fig. 6 is a detail section on the line 6—6 of Fig. 1.
Figure 7:
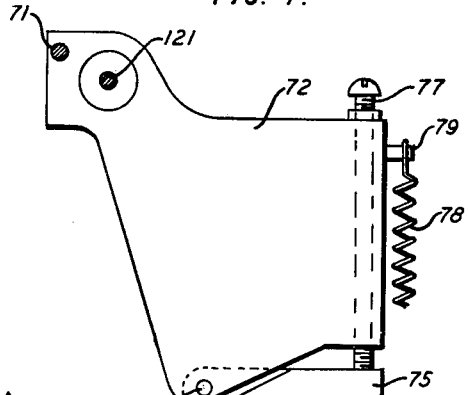
Fig. 7 is a detail section on the line 7—7 of Fig. 2.

In the embodiment of the invention herein disclosed and described, there is a stationary base 20 tabular in general form and bearing a relatively massive pillar 21. A horizontal shaft 22 is rotatably mounted in the pillar and carries rigidly attached at either end one of a pair of ratchet wheels 23 and 24. A pawl 25 pressed by a spring 26 is pivotally mounted in the upper end of a lever 27 which is pivotally mounted on a pin 28 carried by the pillar 21. The lower end of the lever 27 is bifurcated to carry a cam roller 29 mounted therein. The cam roller rides on a rotary cam 30 mounted on a horizontal shaft 31 journalled in the pillar 20. A tension spring 32 attached at one end to a pin 33 on the lever and at the other end to a pin 34 on the pillar serves to keep the roller 29 in contact with the cam 30.

The shaft 22 terminates flush with the right hand face of the ratchet 23, and has there an axial threaded recess 35 which receives a correspondingly threaded stub shaft 36 having at its outer end an integral outwardly extending flange-like coaxial head 37. This head is provided with a peripheral groove which receives a split expansible ring 38. The space between the ratchet 23 and the head 37 is filled with a drum 39 coaxial with the shaft. Thus the shaft, drum and ring are detachable and removable by unscrewing the shaft from the recess 35.

The shafts 22 and 36 have a continuous axial bore in which is loosely positioned a pull-rod 40. The bore is expanded at its right hand end to house a wedge member 42, integral with or pinned to the extremity of the rod 40. One or more, preferably three, radial slots lead from the bottom of the expansion ring groove to the expanded part of the bore. Sliding members 41 positioned in these slots bear at their outer ends against the inner periphery of the split ring 38 and at their inner ends against the wedge member 42. Thus a motion of the wedge member toward the left will tend to expand the split ring.

At the left hand end of the rod 40 there is mounted by means of a removable pin 44, a detachable pivoted cam handle 43 which bears against the left face of the ratchet wheel 24. In the position shown in Fig. 2, the wedge member 42 is drawn to the left and locked there by the action of the cam 43, against the wheel 24, thus expanding the ring 38. By swinging the handle 43 to the left the wedge is released and if the handle be detached the rod and wedge can be entirely removed.

The shaft 22 is slidable longitudinally, as well as rotatable, in the pillar 21, and is formed about midway of its length with a circumferential groove 45. A roller 46 is rotatably mounted on the end of a stud 47 and lies in the groove 45, the stud 46 being radial to the shaft 22. The stud 46 is rigidly attached to a pull rod 48 slidably mounted in the pillar 21, and the stud lies in an appropriate recess in the pillar. The rod 48 is pivoted at its left hand end to one end of a lever 49, pivoted at 50 to the base 20.

The front to back dimensions of the stud 47, and lever 49, have been grossly exaggerated for clarity in the drawings, to bring these parts out from under the shaft 22 and its associated structure. Stud 47 is in actuality a short stud, not a long rod as shown.

The rear end of the lever 49 is formed with a rounded surface coacting with a corresponding surface on the forward end of a lever 51, pivoted at 52 on the base 20. On the rear end of the lever 51 is mounted a cam roller 53 which bears against a three level rotary side cam 54 rigidly mounted on a horizontal shaft 55 journalled in a pedestal 56 on the base 20.

The slotted wheel 57 of a Geneva motion is also rigidly mounted on the shaft 55 beside the cam 54, and is driven by a pin 58 mounted in an arm 59 rigidly mounted on the shaft 31. The usual locking wheel 60 of a Geneva motion is also rigidly mounted on the shaft 31 beside the arm 59 to coact with the wheel 57.

Compression springs 61 are housed in appropriate bores in the pillar 21 and act through interposed sliding blocks 62 which press their rounded extremities against the right hand face of the ratchet wheel 24, thus urging the latter continually to the left.

A carriage 63 is mounted on top of the pillar 21 with freedom to slide horizontally from right to left and back. A pin 64 is fixed in the under side of the carriage and carries at its lower end a cam roller 65 which coacts with the forward end of a three level sliding cam 66 housed in an appropriate horizontal bore in the pillar 21. The rear end of the cam 66 carries a cam roller 67 which coacts with a rotary cam 68 rigidly mounted on the shaft 31.

A second carriage 69 is mounted on the right hand vertical end face of the carriage 63 with freedom to slide up and down thereon. On the rear face of the carriage 69 is an apertured lug 70 into which enters a pin 71 removably mounted on the upper arm of a laminar lever member 72. The lever 72 is pivotally mounted on a stud 73 carried by the pillar 21. A cam roll 74 is mounted in an adjustable member 75 pivotally attached at 76 to the lower arm of the lever 72, and adjustable by means of the screw 77. A tension spring 78, attached at its upper end to a pin 79 on the lever 72 and at its lower end to a member 80 carried by the pillar 21, tends to hold the cam roller 74 in contact with a rotary cam 81 mounted on the shaft 31.

On the shaft 31 is also rigidly mounted a worm gear 82 meshing with a worm 83 on a vertical shaft 84. At the upper end of the shaft 84 is a spur gear 85 meshing with a similar gear 86 on a power shaft 87 driven by any convenient power source, not shown. A second driven gear 88 also meshes with the drive gear 86. The gear 86 is provided with a square axial bore to receive the square upper end of a vertical shaft 89 which has freedom to slide in the gear but must rotate therewith. The various supports for this last described assembly are not shown in the drawings. They comprise appropriate arms and lugs carried on the base 20 and pillar 21, as required.

The shaft 89 is provided with two universal joints, as shown in Fig. 3, to allow of a limited freedom of the lower end of the shaft to move laterally. The lower end of the shaft is journalled in the hollow carriage 69 (Fig. 3) and carries a spur gear 90 which meshes with two independent pinions 91 also mounted in the carriage 69.

Each gear 91 is the terminal member of a sequence of identical intermeshing gears 91, as shown in Fig. 6. There are eight such gears disclosed here but the number will vary with the requirements of an individual machine. Each gear 91 is carried on a removable screw stud 92 (Fig. 3) mounted in the floor of the carriage 69. Each stud 92 has an axial clearance bore aligned with a square axial bore in the corresponding gear 91. A square shanked drill 93 is received in each of the bores of the gears 91 and is vertically adjustable in relation to the carriage 69 by bearing at its rounded upper end against an adjustable thrust block 94 mounted in an appropriate bore in the roof of the carriage. Each block 94 has associated therewith an adjusting screw 95 and a clamp screw 96. The drills 93 are alternately right and left hand as indicated in Fig. 1 to correspond to the alternating directions of rotation of the gears 91.

The machine as thus far described is adapted to operate on cylindrical work. For example, a cup 97 of dimensions appropriate to the drum 39 and ring 38, is slipped into place over these, as shown in dotted lines in Fig. 1, while cam handle 43 is turned to the left out of the position shown in Fig. 2. Turning the handle to the right will expand the ring 38 against the inside of the cup 97 clamping the latter in place. During this operation the carriage 69 must be at the upper limit of its vertical travel. The drills 93 may then be adjusted, if necessary, as also the member 75 to bring the drills into proper relation to the work.

Power is then applied to the shaft 84 to drive the shaft 31. Through the Geneva motion 60, 58, 57 and its associated train of mechanism, the roller 46 and springs 61 enforce on the shaft 22 an intermittent stepwise longitudinal shifting of the shaft 22 and its associated parts, thus causing the cup 97 to traverse intermittently and stepwise from left to right and back under the drills 93.

Figure 8:
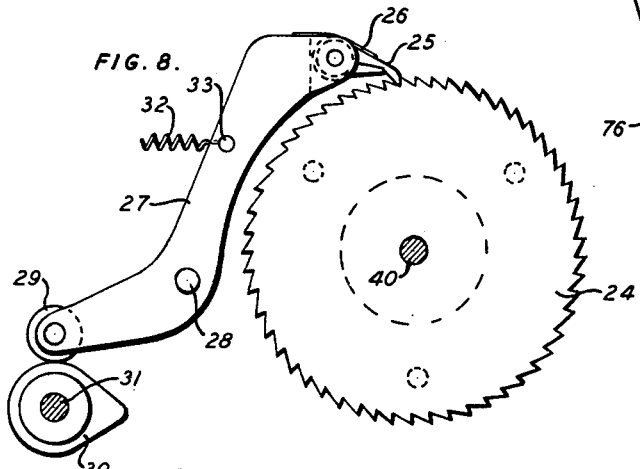
Fig. 8 is a detail section on the line 8—8 of Fig. 2.
Figure 9:
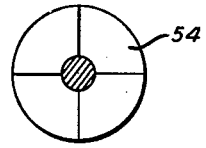
Fig. 9 is a detail section on the line 9—9 of Fig. 1.
Figure 10:
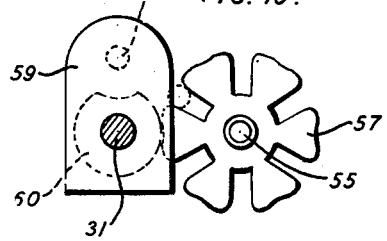
Fig. 10 is a detail section on the line 10—10 of Fig. 2.
Figure 11:
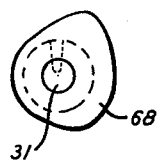
Fig. 11 is a detail section on the line 11—11 of Fig. 2.
Figure 12:
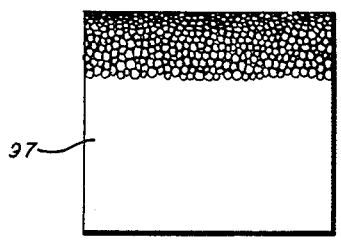
Fig. 12 is a view of a partly treated piece of cylindrical work.
Figure 13:
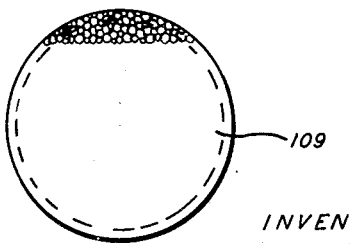
Fig. 13 is a view of a partly treated piece of plane work.

At the same time, the cam 30 and its associated elements drive the pawl 25 to cause the ratchet wheel 24 and shaft 22 to rotate intermittently clockwise as shown in Fig. 8, or top forward as shown in Fig. 2. Thus the cup 97 is caused to rotate intermittently under the drills 93. It is yieldingly held during the backstroke of the pawl by a rounded spring pressed detent 101 acting on the ratchet wheel 23.

The rotary cam 68 drives the sliding cam 66 to drive the stud 64 to cause the carriage 63 to traverse stepwise intermittently from left to right and to permit it to return again in similar fashion under the urge of a tension spring 98 attached at one end to a pin 99 on the carriage 63 and at its other end to an arm 100 rigidly mounted on the pillar 21. The carriage 63 carries the carriage 69 with it in its intermittent left and right traverse thus causing the drills 93 to traverse intermittently along the cup 97 to and fro.

The rotary cam 81 acting through the lever 72 causes the carriage 69 to move periodically up and down on the carriage 63 thus bringing the drills 93 alternately into and out of contact with the cup 97. The drills are kept in continuous rotation by the shaft 89 whose two universal joints and sliding engagement with the gear 88 permit the carriage 69 to execute its lateral and vertical to and fro motions without interrupting the continuity of drive of the drills.

The various cams etc. are so proportioned and related that all relative motions of the carriage 69 and the cup 97 take place at periods when the drills 93 are withdrawn from the cup by the cam 81.

Elements 57, 54, 30, 68 and 66 may be so formed and related that the cycle of relative displacements of the work and the drills is so complex that the pattern of pits produced on the work seems to be entirely haphazard; or the relations may be such as to produce a pattern having a regularity of any desired degree of complexity. Such effects may be further enhanced by the fact that the drills 93 are individually longitudinally adjustable, so that the relative depths and diameters of neighboring pits produced in the work may be varied as well as their relative location. Further variations may be produced by mounting tools of varying form, size, or even kind in the gears 91. In one modification, if rods having small pads of steel wool soldered, clamped to, or otherwise attached to their extremities be used, a pattern is produced not of definite pits, but of scraped or burnished circular or oval spots apparently more or less irregularly located and more or less overlapping each other.

In another modification, the rotary drills and their rotary drive might be replaced by sharp pointed or round ended punches or hammers with reciprocatory driving mechanism in the form of toggles or cams.

When it is desired to operate on a flat surface, pin 44 and handle 43 are removed, wedge 42 and rod 40 are withdrawn, and shaft 36 with drum 39, ring 38 and blocks 41 is unscrewed from shaft 22. The recess 35 is filled with a threaded plug 102 (Fig. 4) bearing an integral axial stud 103. The right hand projecting portion of the base 20 is formed with a dovetail slot and an auxiliary base block 104 having a corresponding dovetail is slid into place thereon. The block 104 has in its left hand vertical face a recess corresponding to the stud 103 which engages therewith and the block is locked to the rotationless shaft 22, by means of a pin 126 passing down through the block and a perforation in the stud 103.

The ratchet 25 is rendered inoperative to move the wheel 24, as for instance by disengaging the spring 32 from the pin 33, when the longer and heavier upper arm of the lever 27 will prevent the roll 29 from following the cam 30 down. Thus the shaft 22 is now without rotation being held by the detent 101. Or means may be provided to release the pawl from its spring and turn the pawl up into an idle position, allowing the lever 27 to rock idly.

A traversable slide 105 is mounted on the upper surface of the block 104 with freedom to move to and fro from front to back, and is urged continually forwardly by a tension spring 106 attached at its forward end to a member 107 carried by the block, and at its rear end to a pin 108 carried by the slide. On the upper face of the slide is means to hold a piece of work having a plane face to be operated on. In the illustration the work is a shallow cup 109 and the means comprise a vertical plug 110 integral with the slide over which the inverted cup fits snugly with its flat bottom up, and a clamp screw 111 also mounted on the slide. On the under face of the slide is a ratchet toothed rack 112.

The rack 112 is engaged by a locking pawl 113 pivotally mounted in the block 104 and held thereby in any given position against the urge of the spring 106. The rack is also engaged by an operating pawl 114 pivoted to the end of the left arm of a lever 115 pivotally mounted on the block 104. Compression springs 116 and 117 serve to press the pawls 113 and 114 respectively into engagement with the rack. The right arm of the lever 115 carries at its extremity a cam roller 118 to coact with a rotary cam 119 rigidly mounted on the shaft 31. The roller is kept against the cam by a tension spring 120 attached at its lower end to the lever 115 and at its upper end to a pin 121, here shown as mounted in the stud 73.

To permit the slide 105 to return forward under the pull of the spring 106 when necessary, a pair of cam rods 122 and 123 is mounted to slide in the block 104 transversely of the slide 105. The tapered ends of these pins are formed and positioned to override and press down the pawls 113 and 114 when the pins are pushed inward to the left, thus disengaging the pawls from the rack. The pins are simultaneously operable by means of a common attached yoke bar 124 operated by a handle lever 125 pivoted to the yoke bar and also to the block 104.

The parts being in the position of Figs. 4 and 5, a piece of work 109 is clamped in place on the plug 110 by means of the screw 111 and the machine is set in operation. The gang of drills or other tools 93 move precisely as before into and out of engagement with the work and also stepwise to and fro from left to right and back.

The Geneva motion 58, 60, 57 operates through its associated train of parts to traverse the shaft 22 and therewith the block 104 stepwise to and fro from left to right and back.

The cam 119 operating through the lever 115 and pawl 114 acts to index the slide or carriage 105 step by step rearwardly, until the treatment of the surface is completed, whereupon rods 122 and 123 are operated by means of handle 125 to disengage pawls 113 and 114. The slide 105 moves forwardly out from under the drills and the finished work may be removed and replaced by a fresh blank.

In the case of either mode of operation, on flat or on curved work, the set of markings produced by any one application of the drills or tools to the work, is distributed in a straight row running from left to right of the machine and at equal intervals. These rows are distributed over the work at regular, equal intervals transversely of their length by the operation of the cam 30 or 119 if of the simple form shown in Figs. 8 and 5. However, it is evident that a large variety of distributions of successive rows of markings transversely of their length may be attained by appropriate variation of the form of this cam. The cam would then preferably not be directly mounted on the shaft 31, but driven from the shaft by appropriate gearing to have the speed and consequent cyclic relation to the other motions of the machine required by the individual case.

The relative position of the work and the gang of tools in a direction from left to right of the machine at any given application of the tools to the work depends upon the individual forms and relative positions of the cams 54 and 66. As shown, roller 53 runs through three positions in a cycle of four changes for each rotation of the Geneva wheel 57, the intermediate position occurring twice in each cycle. For each rotation of the Geneva wheel 57 the shaft 31 and hence the cam 68 makes six revolutions. Each revolution of cam 68 moves stud 64 and hence carriage 69 through a four change cycle of three positions, the intermediate position occurring twice. Thus the relative motion of the work and the tools from left to right of the machine is cyclic and regular, but the cycle of relative positions is complex. The result is that the pattern of markings produced on the work, depending on the forms and relative speeds of the several cams may be varied by varying the cams and their drives as to geometrical relationship from simple aligned or quincunx regularity to a cyclical recurrence so complex as to appear purely haphazard in distribution. The complexity may be further enhanced, if desired, by combining in one gang tools of varying form or even of varying nature.

Thus one essential characteristic of the invention is to provide in the interchangeable cams means to form in the surface repeated impressions of a regular pattern of markings in so complexly regular a cyclic fashion that the resulting compound pattern seems the result of chance distribution of the markings. It will be noted that the several cams controlling the cyclic shiftings of the work and of the tools are readily interchangeable to alter the spacing as well as the positional relations of the markings by altering both the combined cycles of repetition individually of their motion and the correlations of the cycles with each other.

The embodiment of the invention herein disclosed is self-evidently illustrative merely, and may be modified and departed from without departing from the spirit and scope of the invention as particularly pointed out in and limited only by the appended claims.

What is claimed is:

1. In a material working machine, a carriage to hold a piece of work, a second carriage to hold a tool, means to move the work relatively to the tool in one direction, means to move the work in a second direction relatively to the tool, means to move the tool relatively to the work, and means to engage the tool operatively with the work and to disengage it therefrom.

2. In a material working machine, a carriage to hold a piece of work, a second carriage to hold a gang of tools, means to move the work relatively to the gang of tools in one direction, means to move the work in a second direction relatively to the gang of tools, means to move the gang of tools relatively to the work, and means to engage the gang of tools operatively with the work and to disengage them therefrom.

3. In a material working machine, a carriage to hold a piece of work, a second carriage to hold a tool, means to engage the tool operatively with the work and to disengage it therefrom repeatedly, means to move the work relatively to the tool in one direction during a time of disengagement of work and tool, means to simultaneously move the work relatively to the tool in another direction, and means to simultaneously move the tool relatively to the work.

4. In a material working machine, a carriage to hold a piece of work, a second carriage to hold a gang of tools, means to engage the gang of tools operatively with the work and to disengage them therefrom repeatedly, means to move the work relatively to the gang of tools in one direction during a time of disengagement of work and a gang of tools, means to simultaneously move the work relatively to the gang of tools in another direction, and means to simultaneously move the gang of tools relatively to the work.

5. In a material working machine, a base, a first movable carriage thereon to hold a piece of work, a second movable carriage on the base to hold a tool, means to move the second carriage in one direction to bring the tool into and out of operative engagement with the work, independent means to move the second carriage in another direction to change the point of application of the tool to the work, means to move the first carriage in one direction, and means to move the first carriage in a second direction.

6. In a material working machine, a base, a support movably mounted thereon to hold a piece of work, a carriage movably mounted on the base to hold a tool, means to move the carriage in one direction to engage the tool with and disengage it from the work in cyclic repetition, means to move the carriage in another direction through a sequence of positions in cyclic repetition, means to move the support stepwise in one direction through a sequence of positions, and means to move the support in another direction through a sequence of positions in cyclic repetition.

7. In a material working machine, a base, a support mounted thereon with freedom to move in two directions to hold a piece of work, a carriage to hold a tool mounted on the base with freedom to move in two directions, adjustable first means to move the carriage in its one direction to bring the tool into and out of engagement with the work, second means to move the carriage in its other direction step by step through a sequence of positions, third means to move the support step by step through a sequence of positions in its one direction, fourth means to move the support step by step through a sequence of positions in its other direction, and means to drive the first and second and third means in correlated cycles of repetition.

8. In a material working machine, a base, a support mounted thereon with freedom to move in two directions to hold a piece of work, a carriage to hold a tool mounted on the base with freedom to move in two directions, adjustable first means to move the carriage in its one direction to bring the tool into and out of engagement with the work, second means to move the carriage in its other direction step by step through a sequence of positions, third means to move the support step by step through a sequence of positions in its one direction, fourth means to move the support step by step through a sequence of positions in its other direction, and means including interchangeable cams to drive the first and second and third means in correlated cycles of repetition.

9. In a material working machine, a work holding carriage, a tool holding carriage, automatic means to move the work holding carriage stepwise through a predetermined cycle of positions in a fixed direction, automatic means to move the same carriage stepwise through another predetermined cycle of positions in another fixed direction, automatic means to move the tool holding carriage in a fixed direction to bring the tools into and out of operative engagement with a piece of work in the work holding carriage, and automatic means to move the tool holding carriage stepwise in another fixed direction through a predetermined cycle of positions.

10. In a material working machine, a work holding carriage, a tool holding carriage, automatic means to move the work holding carriage stepwise through a predetermined cycle of positions in a fixed direction, automatic means to move the same carriage stepwise through another predetermined cycle of positions in another fixed direction, automatic means to move the tool holding carriage in a fixed direction to bring the tools into and out of operative engagement with a piece of work in the work holding carriage, automatic means to move the tool holding carriage stepwise in another fixed direction through a predetermined cycle of positions, and means to drive the four several automatic means in correlated synchronism.

11. In a material working machine, a work holding carriage free to move in either of two diverse directions, a tool holding carriage free to move in a first direction substantially perpendicular to the plane of the two motions of the work holding carriage and also free to move in a second direction substantially parallel to said plane, a driving member, means including a cam operated by the driving member to move the work holding carriage in one of its directions of motion, means including a second cam operated by the driving member to move the work holding carriage in the other of its directions, means including a third cam operated by the driving member to drive the tool holding carriage in the first of its directions for engaging a tool with and disengaging the tool from a piece of work carried by the work holding carriage, and means including a fourth cam operated by the driving member to drive the tool holding carriage in the second of its directions.

12. A method of surface ornamenting materials which includes the step of impressing a predetermined pattern of markings upon a surface of an article a predetermined number of times and displacing the pattern upon the surface at successive impressions through a predetermined complexly regular cycle of relative positions, whereby the complexity of the compound pattern of markings produced is such as to appear irregularly haphazard.

13. A method of surface ornamenting materials which includes the step of impressing a predetermined regular pattern of markings upon a surface of an article a predetermined number of times, and predeterminedly displacing the pattern upon the surface at successive impressions through a predetermined complexly regular cycle of relative positions, whereby the complexity of the combined compound pattern produced is such as to have the appearance of haphazardly distributed markings.

THEOPHILE CORBEELS.